(12) United States Patent
Otsuka (10) Patent No.: US 6,619,328 B2
(45) Date of Patent: Sep. 16, 2003

(54) TUBULAR MEMBER CONSTRUCTION

(75) Inventor: Kunio Otsuka, Tokyo (JP)

(73) Assignee: Ohtsuka Co., Ltd., Tokyo (JP)

( * ) Notice: Subject to any disclaimer, the term of this patent is extended or adjusted under 35 U.S.C. 154(b) by 0 days.

(21) Appl. No.: 10/084,445

(22) Filed: Feb. 28, 2002

(65) Prior Publication Data
US 2003/0024585 A1 Feb. 6, 2003

(30) Foreign Application Priority Data
Aug. 3, 2001 (JP) ........................................ 2001-235853

(51) Int. Cl.$^7$ ................................................ F16L 11/00
(52) U.S. Cl. ........................ 138/121; 138/177; 138/109; 138/129; 138/122
(58) Field of Search ................................ 138/129, 121, 138/122, 109, 177, 178, 134, 135, 151, 156

(56) References Cited

U.S. PATENT DOCUMENTS 3,738,394 A * 6/1973 Westerbarkey ............. 114/126
3,758,139 A * 9/1973 Meserole ..................... 285/332
3,794,364 A * 2/1974 Williams ..................... 285/390
4,327,776 A * 5/1982 Meserole ..................... 138/109
6,488,053 B1 * 12/2002 Tadokoro ..................... 138/156

* cited by examiner

Primary Examiner—Patrick Brinson
(74) Attorney, Agent, or Firm—Birch, Stewart, Kolasch & Birch, LLP (57) ABSTRACT

The present invention provides a tubular member construction capable of preventing the end portion of a flexible pipe formed of a band member from coming loose without costing. The flexible pipe is formed by winding a metallic tubular member in a spiral shape in an overlapped manner, and a plurality of wavy corrugations are formed on the peripheral wall surface of the flexible pipe continuously in the axial direction. In order to prevent a band member located in an end portion of the flexible pipe from coming loose, collapsed portions are formed on corrugations located in the end portions of the tubular member.

10 Claims, 9 Drawing Sheets

TUBULAR MEMBER CONSTRUCTION

BACKGROUND OF THE INVENTION AND RELATED ART STATEMENT

1. Field of the Invention

The present invention relates to a tubular member construction which has flexibility and is provided with ring-shaped or spiral-shaped corrugations on the peripheral wall of a tubular member.

2. Description of Related Art

Figure 12:
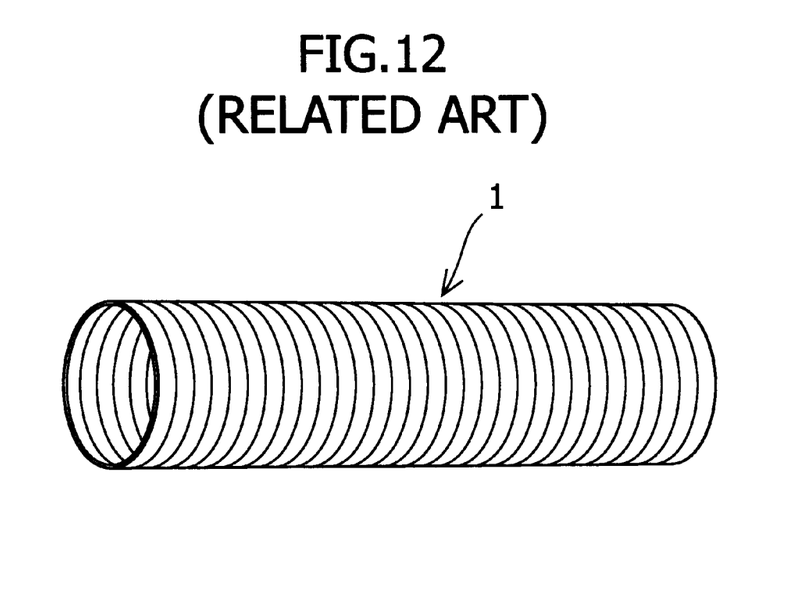
FIG. 12 is a perspective view of a conventional flexible pipe which is not subjected to collapsing operation.

A metallic band member having a flat plate shape is turned so as to be wound into a spiral shape, and a lower edge portion and an upper edge portion of the band member are lapped on each other, by which a tubular member that is long in one direction can be formed. If spiral-shaped corrugations as shown in FIG. 12 are formed on the peripheral wall of the tubular member thus formed (see FIG. 2C), or if ring-shaped corrugations are formed continuously in the axial direction of the tubular member, the tubular member can be provided with flexibility as known well. This tubular member 1 having flexibility can be formed by using one or a plurality of band members.

Such a flexible pipe 1 is used in various applications; for example, it is used to cover the peripheral portion of an electrical harness or a pipe for a vehicle. That is, the flexible pipe 1 is used as a protective material for preventing these elements from being damaged by the interference with a vehicular structural member.

Figure 13:
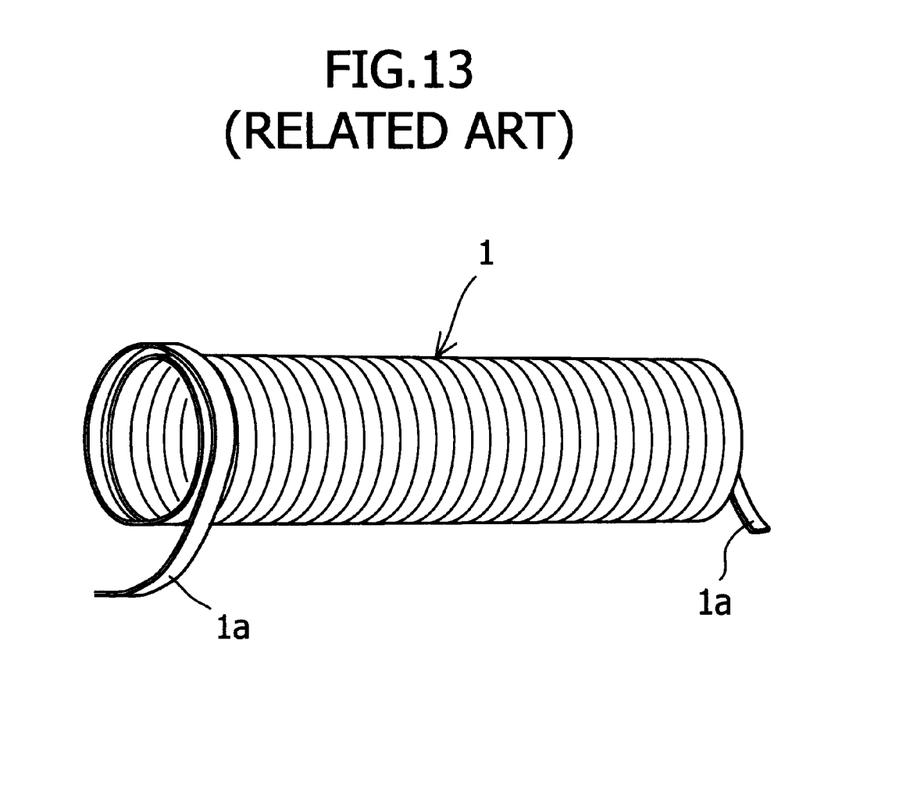
FIG. 13 is a perspective view showing a state in which the end portions of the flexible pipe shown in FIG. 12 come loose.

The flexible pipe 1 maintains its shape due to the characteristics of the metal itself. However, for example, in the case where the flexible pipe 1 is used in a vibrating portion, as the pipe is repeatedly subjected to bending deformation, or in some applications of the flexible pipe 1, looseness 1a is produced at the end of the flexible pipe 1 as shown in FIG. 13. Especially when the flexible pipe 1 is formed by overlapping two or more band members inside and outside, the flexible pipe 1 is liable to come loose as compared with the flexible pipe 1 formed by one band member. In addition to this, when the band member is formed by different types of metals and used in a hot portion, the flexible pipe 1 is much liable to come loose due to a difference in thermal expansion between the inside layer material and the outside layer material.

To prevent the looseness, the overlapped portion of band members of the flexible pipe 1 is bonded with an adhesive. Also, it is conceivable that the looseness can be prevented by putting a cap at the end of the flexible pipe 1.

OBJECT AND SUMMARY OF THE INVENTION

However, if the flexible pipe is bonded with an adhesive, the flexibility of the flexible pipe is lost by the hardness of the adhesive. Further, in the case where the flexible pipe is disposed in a hot portion, the adhesive is sometimes denatured by heat so that the adhesive strength is lost, which results in a high manufacturing cost.

If a cap is put at the end of the flexible pipe, in this case as well, if the flexible pipe is disposed in a hot portion, the material is restricted and becomes expensive. In the case where the cap is disposed in a vibrating portion, the cap may come off unless an adhesive is used.

Also, when a vehicular harness, pipe, or the like has already been connected to the vehicle and is not detachable, in some cases, a split pipe (see FIG. 7) is formed by splitting the flexible pipe, and the flexible pipe is mounted around the harness etc. via a split after the harness etc. have been connected. In this case as well, there arises a problem in that the split edge portion comes loose when an attempt is made to widen the split in order to mount the split pipe on the harness.

The present invention has been made in view of the above situation, and accordingly an object thereof is to provide a tubular member construction capable of preventing the end portion or edge portion of a flexible pipe from coming loose without costing.

To achieve the above object, the present invention provides a tubular member construction in which a tubular member is formed by winding a metallic band material in a spiral shape in an overlapped manner, and a plurality of wavy corrugations are formed in the peripheral wall portion of the tubular member in the axial direction of the tubular member, wherein the corrugations located in an opening end portion of the tubular member are pressed and collapsed to form a collapsed portion so as to prevent the band material located in the opening end portion from coming loose.

Also, to achieve the above object, the present invention provides a tubular member construction in which a tubular member is formed by winding a metallic band material in a spiral shape in an overlapped manner, and a plurality of wavy corrugations are formed in the peripheral wall portion of the tubular member in the axial direction of the tubular member, wherein slit edge portions are formed by one split formed in the range from one opening end portion to the other opening end portion of the tubular member, and the corrugations located in the split edge portions are pressed and collapsed to form a collapsed portion so as to prevent the band material located in the split edge portion from coming loose.

The above-mentioned tubular member can be constructed as described below.

The tubular member can be made flexible. Also, by using two or more of the metallic band materials, the band materials can be overlapped with each other inside and outside to form a tubular member of two or more layers.

The two or more band members can be formed of two or more different types of metals. Further, two of the band materials can be used, and an inside layer material of the tubular member can be formed of stainless steel or a stainless steel alloy and an outside layer material thereof can be formed of aluminum or an aluminum alloy.

Also, the collapsed portion of the tubular member can be formed in a plurality of locations at intervals.

The tubular member can be manufactured by inserting the corrugations of the tubular member between a gear and a dolly block, which are disposed with a predetermined gap provided therebetween, and by pressing teeth of the gear against the corrugations while the gear is rotated to form the collapsed portions.

Further, the tubular member can be mounted at the outer periphery of an exhaust gas recirculation (EGR) pipe for connecting an intake pipe connected to a combustion air intake port of an automobile engine to an exhaust pipe connected to a combustion gas exhaust port of the engine.

Also, the tubular member can be flexible, and the tubular member can be mounted around at least one of exhaust pipes connected to both ends of a catalytic converter provided on the combustion gas exhaust port side of an engine.

DETAILED DESCRIPTION OF PREFERRED EMBODIMENTS

A tubular member construction in accordance with a first embodiment of the present invention will now be described with reference to the accompanying drawings.

Figure 1:
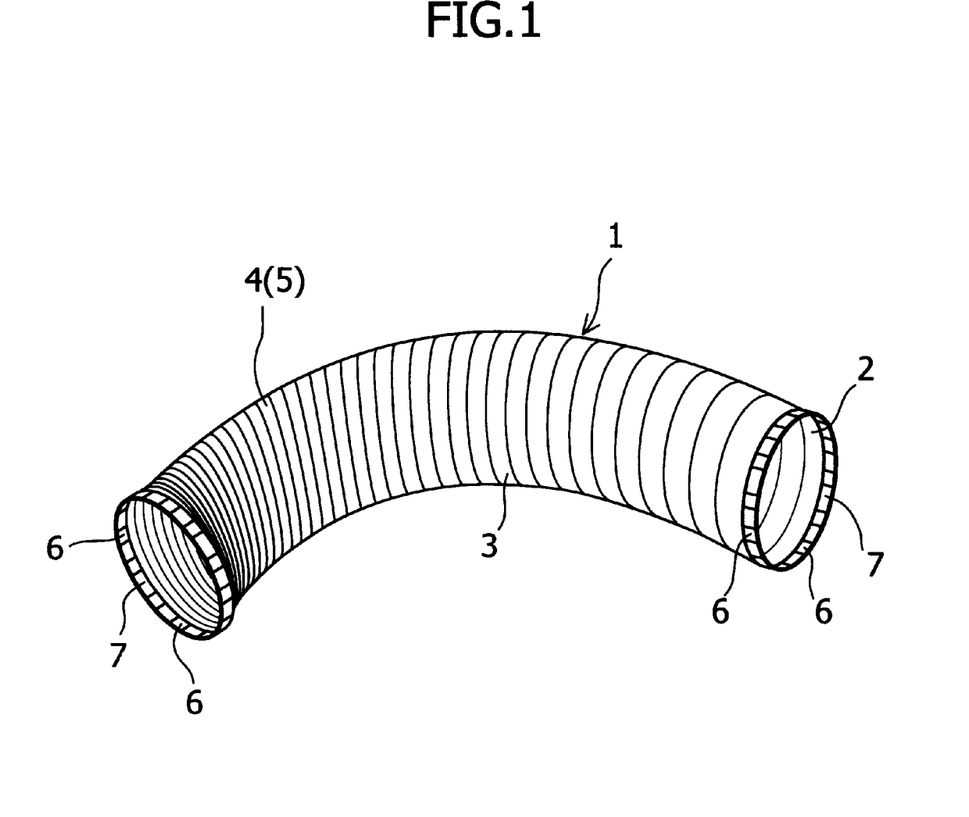
FIG. 1 is a perspective view of a flexible pipe using a tubular member construction in accordance with a first embodiment of the present invention.
Figure 2A:
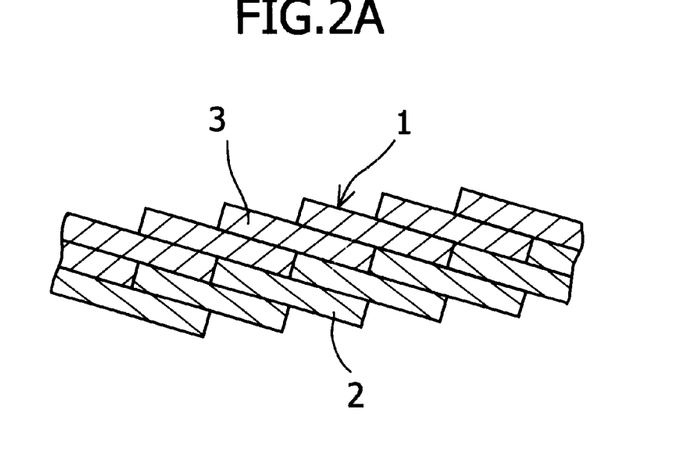
FIG. 2A is an enlarged sectional view of the flexible pipe shown in FIG. 1 before corrugations are formed thereon.
Figure 2B:
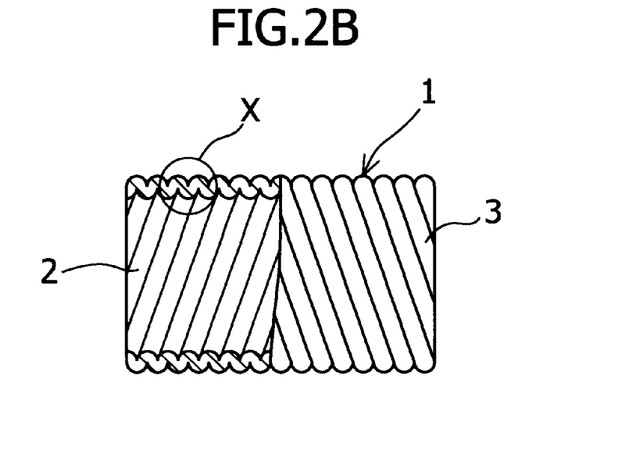
FIG. 2B is a partially sectional view of the flexible pipe shown in FIG. 1 before a collapsed portion is formed in an end portion thereof.

A tubular member 1 shown in FIG. 1 is a tubular element having a circular cross section and is formed of stainless steel and aluminum. As shown in FIG. 2A, stainless steel is used as an inside layer material 2 and aluminum is used as an outside layer material 3 to form a tubular shape as shown in FIG. 2B. The inside layer material 2 is formed into a tubular shape by winding a thin flat plate shaped band material made of stainless steel in a spiral shape while the side edge portions thereof are lapped on each other.

Also, the outside layer material 3 is formed by winding a thin flat plate shaped band material made of aluminum in a spiral shape around the inside layer material 2 in the same way. The tubular member 1 may be such that the band materials for the inside layer material 2 and the outside layer material 3 are separately overlapped with each other. That is, after being overlapped with each other, these two overlapped band materials may be wound in a spiral shape.

Figure 2C:
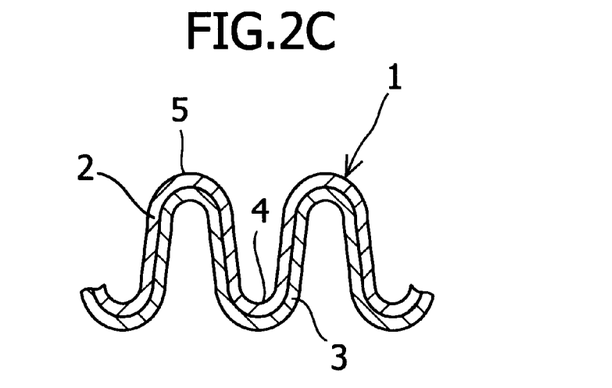
FIG. 2C is an enlarged sectional view of portion X in FIG. 2B.

As shown in FIGS. 2B and 2C, on the peripheral wall of the formed tubular member 1, spiral-shaped or ring-shaped corrugations 4, 5 are formed continuously in the axial direction of the tubular member (hereinafter referred to as a flexible pipe) 1 by the publicly-known method.

Figure 3:
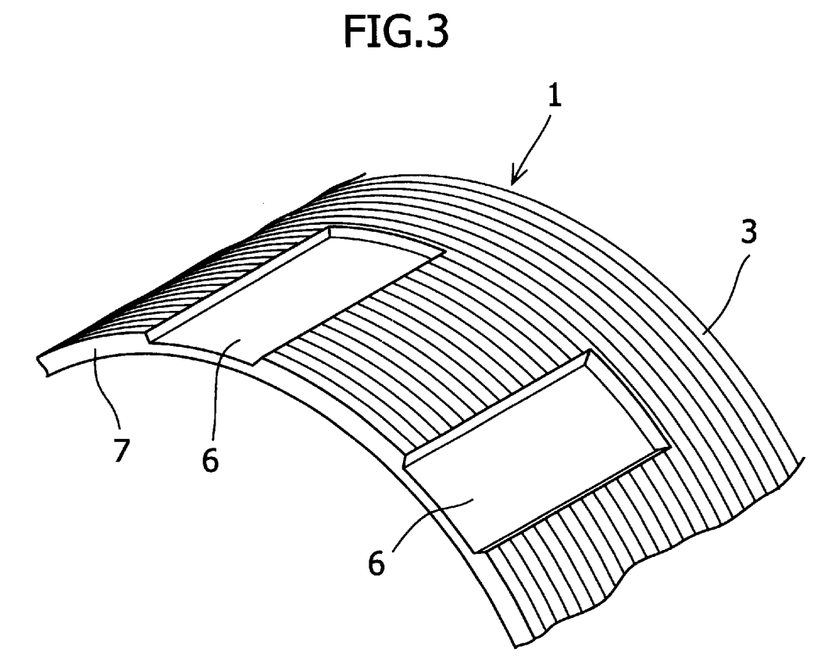
FIG. 3 is an enlarged perspective view of a collapsed portion formed in an end portion of the flexible pipe shown in FIG. 1.

In both end portions 7 of the flexible pipe 1, as shown in FIG. 3, collapsed portions 6 are formed at a plurality of locations at approximately equal intervals in the circumferential direction of the flexible pipe 1 by the pressure forming of the corrugations 4, 5. The method for forming the collapsed portion 6 may be to collapse the corrugations 4, 5 in both end portions 7 manually by using a tool such as pliers or to collapse them by a mechanical method. Although the collapsed portions have been formed partially at a plurality of locations in the above description, the entire circumferential face of the end portions 7 of the flexible pipe 1 may be collapsed. Also, although the corrugations 4, 5 have been collapsed in the circumferential direction of the flexible pipe 1 in the above description, the corrugations 4, 5 may be collapsed in the axial direction thereof.

As a material for the flexible pipe 1, materials of aluminum-based, stainless steel based, and iron-based metals, alloys thereof, other metals, plastics, and paper can appropriately be used combinedly according to the application of the pipe 1. Also, as a cross-sectional shape in the radial direction of the flexible pipe 1, besides a circle, an ellipse, triangle, square, and other polygons can be used appropriately according to the application of the pipe 1.

Figure 4:
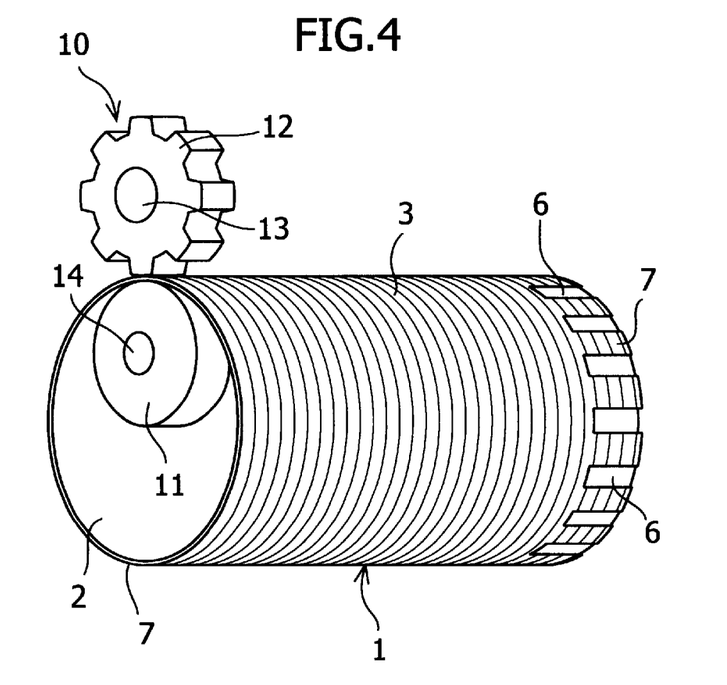
FIG. 4 is a perspective view of a collapsing device that is collapsing and forming an end portion of a flexible pipe.

As an example of collapsing method for the flexible pipe 1, a method using a collapsing device 10 will be described with reference to FIGS. 4 and 5.

The collapsing device 10 is provided with a fixed roller 11 and a movable gear 12, which are equal in outside diameter. However, the outside diameter of the roller 11 has only to be such that the roller 11 can be inserted in the flexible pipe 1. The roller 11 and the gear 12 are disposed with a small gap s provided between the outer peripheral face of the roller 11 and the tooth tip of the gear 12. The gap s is formed so as to be smaller than height L from the top of a peak portion 5 of the corrugations of the flexible pipe 1 to the bottom of a valley portion 4 thereof. The movable gear 12 has a movable shaft 13 capable of being moved vertically so that the width of the gap s can be changed. The gear 12 can be rotated by a drive unit, not shown, while the roller 11 rotates freely with respect to a fixed shaft 14.

When the end portion of the flexible pipe 1 is collapsed and formed, the movable shaft 13 of the movable gear 12 is moved to the upside to increase the gap s, by which the end portion on one end side in the axial direction of the flexible pipe 1 is inserted in the gap s. Then, the gap s is adjusted, for example, so as to have a width slightly larger than the plate (band material) thickness of the flexible pipe 1. The flexible pipe 1 is supported by the operator's hand; alternatively, it may be supported mechanically. In this state, the gear 12 is rotated by using the drive unit. Along with the rotation of the gear 12, the flexible pipe 1 rotates, and hence the roller 11 being in contact with the flexible pipe 1 rotates. At this time, the operator need not rotate the flexible pipe 1 intentionally. This is because the flexible pipe rotates in a slave manner along with the rotation of the gear 12.

The tooth profile of the gear 12 can have any shape that can form the collapsed portion in the end portion of the flexible pipe 1.

By crushing the flexible pipe 1 by using the tooth tip of the gear 12, the peak portion 5 of the flexible pipe 1 is collapsed, and the collapsed portions 6 are formed at intervals corresponding to the pitch of the gear 12 in the circumferential direction of the flexible pipe 1. In a portion in which the tooth of the gear 12 does not come into contact with the flexible pipe 1, the collapsed portion 6 is not formed as shown in FIG. 3. The face width of the gear 12 is about 10 mm in this embodiment, so that the collapse width is also 10 mm. When it is to be desired that the interval (pitch width) of the collapsed portions 6 or the collapse width is adjusted, the gear has only to be replaced.

For the amount of collapse of the corrugations 4, 5, the length L from the top of the peak portion 5 of the flexible pipe 1 to the bottom of the valley portion 4 thereof need not be collapsed completely, but the collapse thickness may be about ½L, for example.

The end portion of the flexible pipe 1 thus formed does not come loose even if an adhesive or other fastening means is not used, and also the flexible pipe 1 can be manufactured at a low cost as compared with the case where an adhesive or other fastening means is used. Also, even if the flexible pipe 1 is used in a vibrating portion or a hot portion, the end portion thereof does not come loose, so that the flexible pipe 1 can stand practical use.

Figure 6:
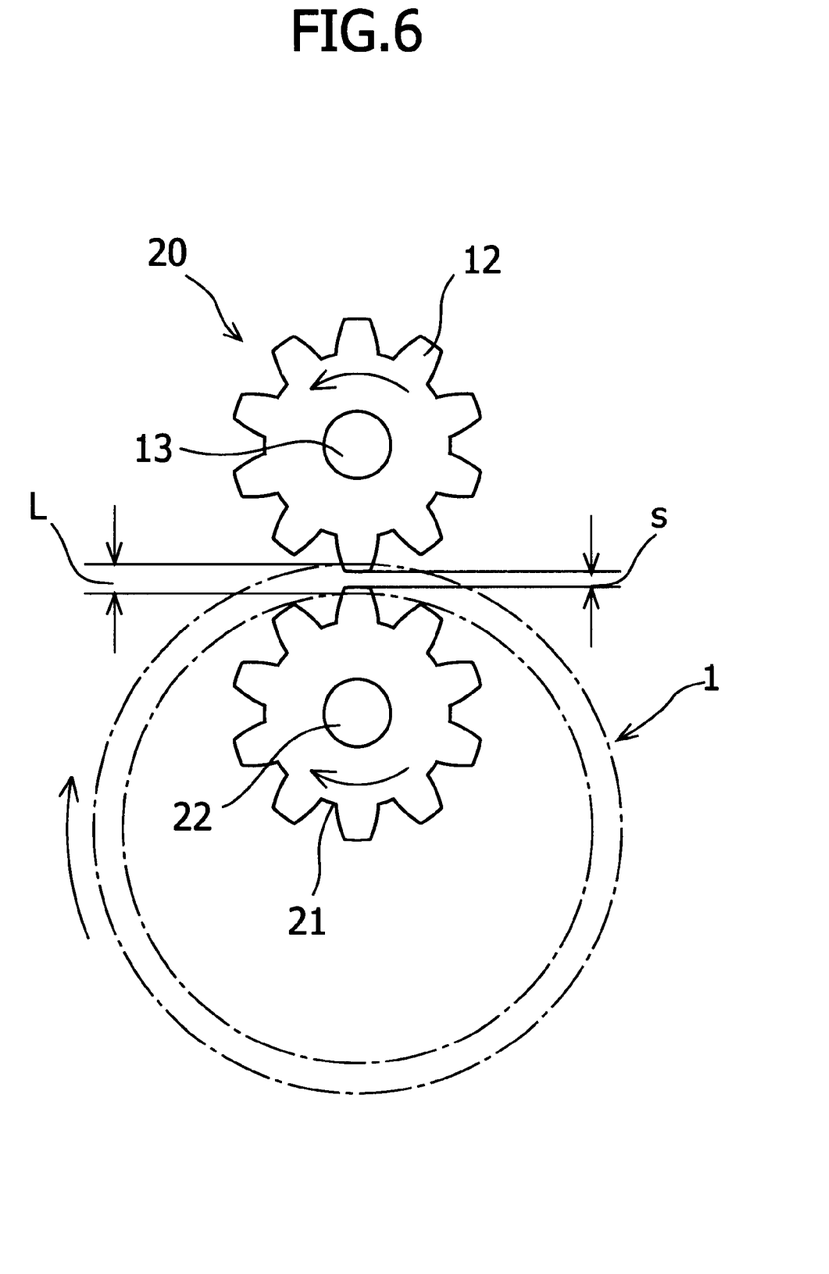
FIG. 6 is a side view of a collapsing device according to a modification that is collapsing and forming an end portion of a flexible pipe.

FIG. 6 shows a modification of a collapsing device.

Figure 5:
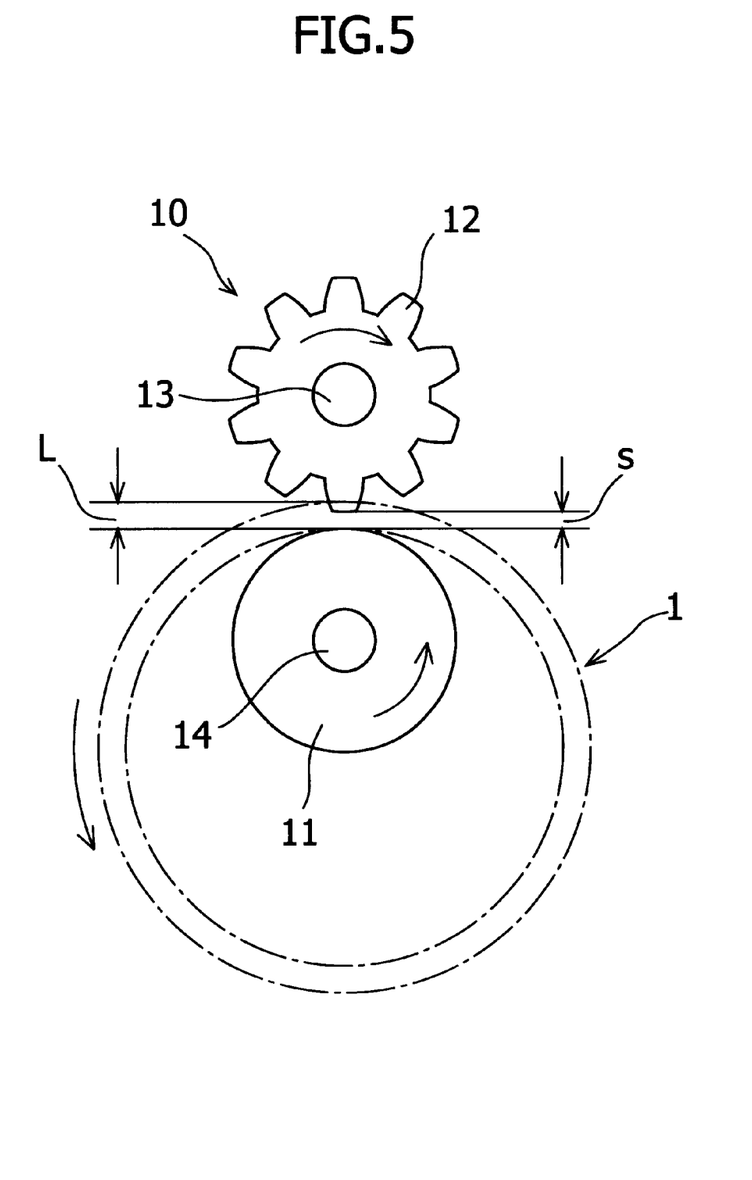
FIG. 5 is a side view of a collapsing device that is collapsing and forming an end portion of a flexible pipe.

In a collapsing device 20 shown in FIG. 6, a fixed gear 21 having a fixed shaft 22 is used in place of the fixed roller 11 shown in FIG. 5. The outside diameter, the number of teeth, and pitch of the gear 21 are the same as those of the gear 12. The gears 12 and 21 are disposed with a small gap S provided therebetween so that the teeth of the gears 12 and 21 do not engage with each other and the tip portions of the teeth thereof face each other at the time of rotation. The gap S is formed so as to be smaller than the height L from the top of the peak portion 5 of the corrugations of the flexible pipe 1 to the bottom of the valley portion 4 thereof. Each of the gears 12 and 21 can be rotated by means of a drive unit, not shown. When these two gears are rotated, the rotation is synchronized so that the tip portions of the gears face each other.

By using the collapsing device 20 constructed as described above as well, the collapsed portions 6 can be formed at the end portion of the flexible pipe 1 as in the case of the above-mentioned collapsing device 10, so that the end portion of the flexible pipe 1 does not come loose.

Next, a tubular member construction in accordance with a second embodiment of the present invention will be described with reference to the accompanying drawings.

Figure 7:
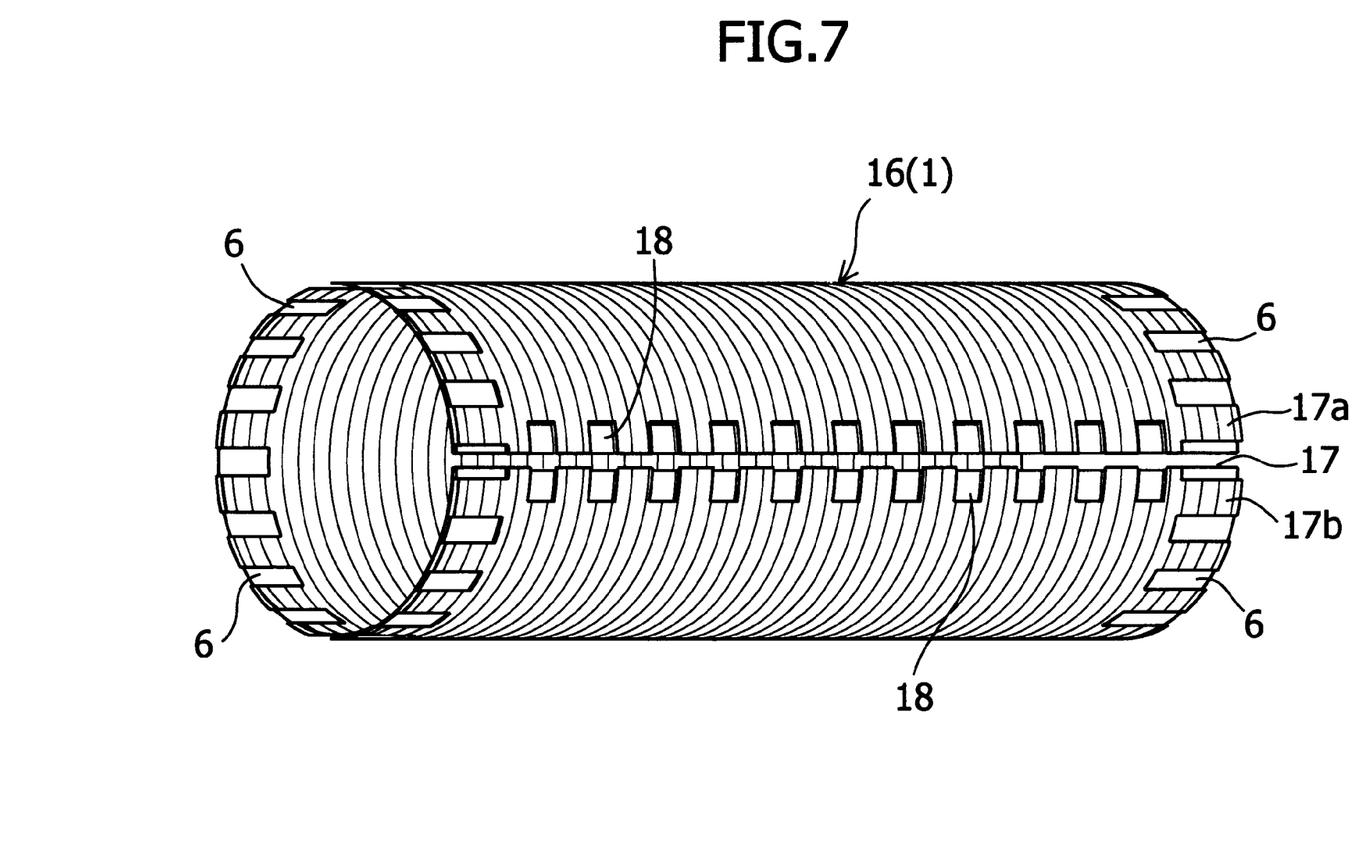
FIG. 7 is a perspective view of a split pipe using a tubular member construction in accordance with a second embodiment of the present invention.

For a split pipe 16 shown in FIG. 7, collapsed portions 6 are formed at both end portions of the flexible pipe 1 in accordance with the above-mentioned first embodiment, and subsequently the flexible pipe 1 is split. The method for manufacturing the flexible pipe 1 and the method for forming the collapsed portions 6 can use the same procedure as that in the above-mentioned first embodiment. The split pipe 16 is formed with one split 17 in an arbitrary peripheral wall portion of the flexible pipe 1. The split 17 is formed linearly in the axial direction of the flexible pipe 1, and a plurality of collapsed portions 18 are formed at substantially fixed intervals in both edge portions of the split 17.

The following is a description of a manufacturing procedure for the split pipe 16.

Figure 8:
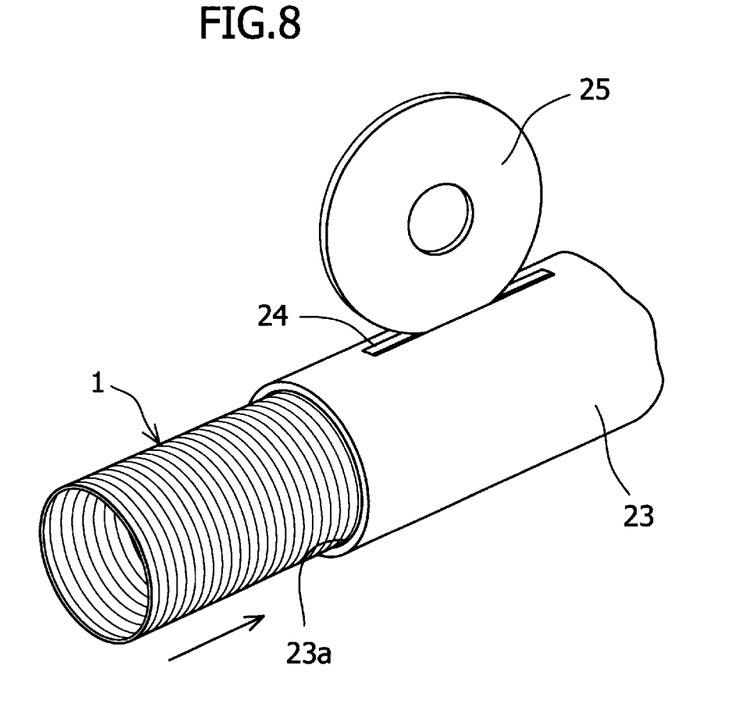
FIG. 8 is a perspective view showing a state in which the flexible pipe shown in FIG. 1 is split.

As shown in FIG. 8, a cylindrical pipe 23 that is long in the axial direction is provided, and a slit 24 passing through the pipe wall is formed in the outer peripheral portion of the cylindrical pipe 23. A rotary cutter 25 is disposed so as to face the slit 24. The tip end portion of a blade of the rotary cutter 25 passes through the slit 24 and projects down to the inside of the cylindrical pipe 23. In a one-end opening 23a of the cylindrical pipe 23, a one-end portion of the flexible pipe 1 described in the above-mentioned first embodiment is inserted. The cylindrical pipe 23 has only to have an inside diameter such that a small gap is formed between the inside surface of the cylindrical pipe 23 and the outer peripheral surface of the flexible pipe 1. The flexible pipe 1 that has been formed with the collapsed portions 6 in both end portions thereof is used.

In this state, when the cutter 25 is rotated while the flexible pipe 1 is inserted into the cylindrical pipe 23, the blade of the cutter 25 is fed in from the end portion of the flexible pipe 1, by which the flexible pipe 1 is cut to form the split pipe 16. At this time, the split pipe 16 is self-propelled in the cylindrical pipe 23 due to the rotational force of the cutter 25, so that there is no need for intentionally feeding the flexible pipe 1 toward the cutter 25. However, the speed of the flexible pipe is sometimes increased due to an impetus of the rotating blade, so that it is necessary to provide any stopping means or a sufficient space on the discharge end side of the cylindrical pipe 23.

Figure 9:
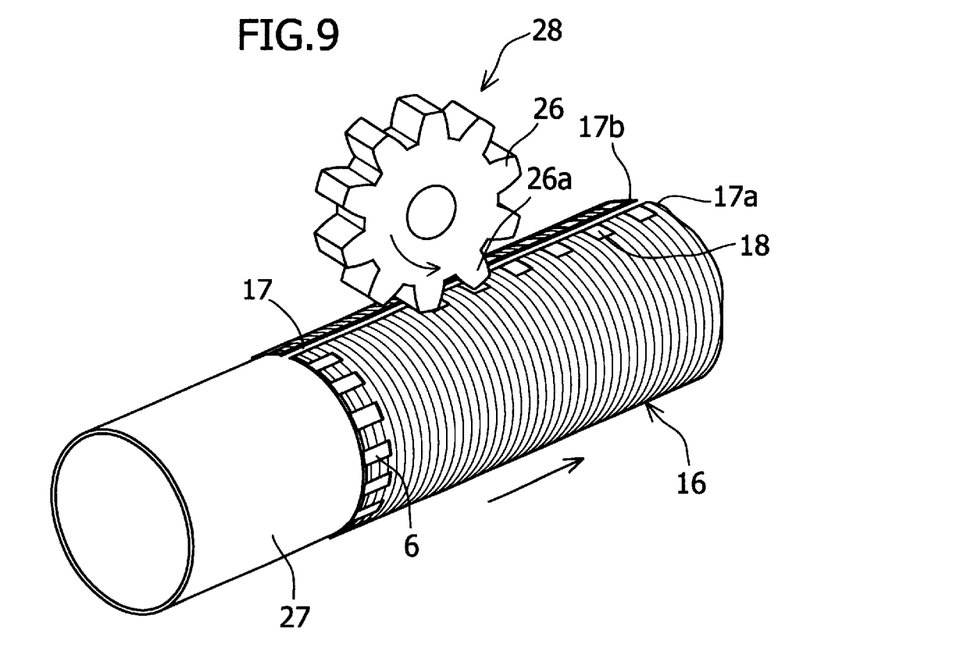
FIG. 9 is a perspective view showing a state in which collapsed portions are formed on the split pipe shown in FIG. 8.

FIG. 9 shows a state in which a collapsing device 28 is forming the collapsed portions 18 in both edge portions 17a and 17b of the split 17 of the split pipe 16.

The collapsing device 28 is provided with a guide pipe 27 serving as a dolly block and a driving gear 26. The driving gear 26 is connected with a driving device (not shown). A gap between the tip of a tooth 26a of the gear 26 and the outer peripheral surface of the guide pipe 27 can be adjusted, and in this embodiment, the gap is adjusted so as to have a width of about ⅓ of the height of corrugations 4, 5 of the pipe 16.

The outside diameter of the guide pipe 27 is approximately equal to the inside diameter of the split pipe 16. The split pipe 16 is mounted on the outer periphery of the pipe 27 with the split 17 facing the gear 26.

When the gear 26 constructed as described above is rotated, the teeth 26a of the gear 26 crush the corrugations 4, 5 of the split pipe 16, by which the collapsed portions 18 are formed in both edge portions 17a and 17b. In this case as well, the split pipe 16 is self-propelled in the axial direction of the guide pipe 27 due to the rotational force of the gear 26, so that there is no need for intentionally feeding the split pipe 16. Thus, by forming the collapsed portions 18 in both edge portions 17a and 17b of the split pipe 16, a band member in both edge portions 17a and 17b is prevented from coming loose even if the split 17 of the split pipe 16 is widened.

Next, an example of specific application of the flexible pipe 1 will be described briefly.

Figure 10:
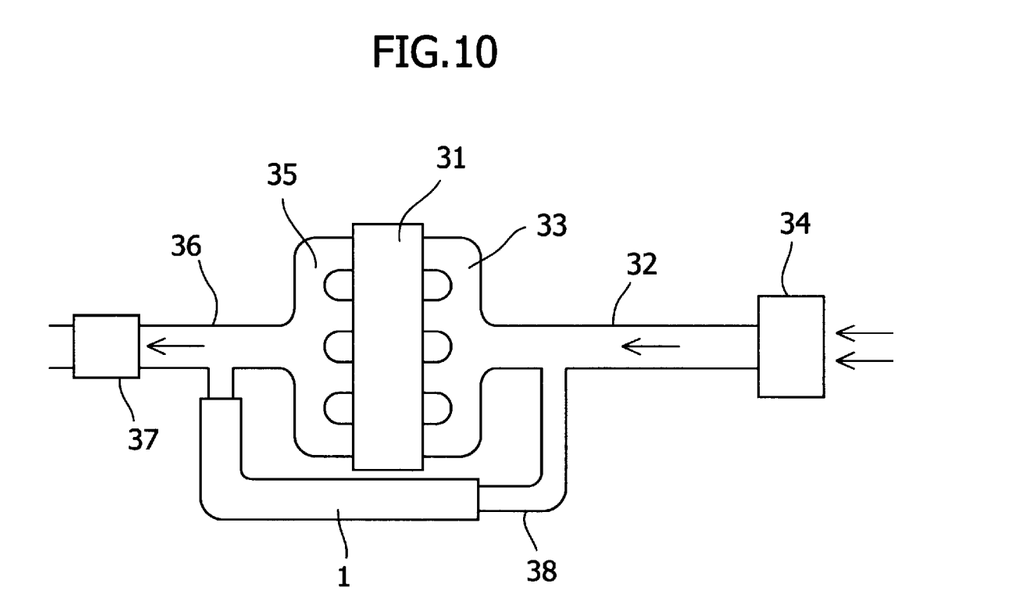
FIG. 10 is a schematic view of an engine section, showing an example of specific application of a flexible pipe in accordance with an embodiment of the present invention.

FIG. 10 is a schematic view of an automobile engine section. On the air intake system side of an engine 31, an air cleaner 34 is connected via an intake pipe 32 and an intake manifold 33. On the exhaust system side of the engine 31, a catalytic converter 37 is connected via an exhaust manifold 35 and an exhaust pipe 36. Between the intake pipe 32 and the exhaust pipe 36, an exhaust gas recirculation (hereinafter referred to as EGR) pipe 38 for an EGR system is connected in such a manner as to stride the engine. This EGR system is a system for restraining the generation of NOx.

As shown in FIG. 10, the flexible pipe 1 is mounted around the EGR pipe 38. The flexible pipe 1 can be mounted in a portion in which the EGR pipe is bent because of its flexibility. The flexible pipe 1 dissipates heat easily due to its large surface area because the surface thereof has a corrugated shape, so that it functions as a heat insulating material together with the air. Specifically, even if the worker touches the flexible pipe 1 mounted around the EGR pipe 38 just after the running of vehicle inadvertently during the work, the flexible pipe 1 mounted around the EGR pipe 38 functions as a protective material for preventing the worker from getting burned.

Also, the EGR pipe 38 is subjected to vibrations transmitted from the engine 31. However, since the end portions of the flexible pipe 1 are collapsed, the flexible pipe withstands the vibration, and the end portions thereof do not come loose. A heat-resisting heat insulating material such as fibers may be interposed between the inner peripheral wall of the flexible pipe 1 and the outer periphery of the EGR pipe 38 to further enhance the heat insulating properties. Before the EGR pipe 38 is welded to the intake pipe 32 and the exhaust pipe 36, the flexible pipe 1 is used, whereas after the intake pipe 32 and the exhaust pipe 36 have been welded to the EGR pipe 38, the split pipe 16 formed with the collapsed portions 18 is mounted on the EGR pipe 38. At this time, even if the split 17 is widened, the band member in both edge portions 17a and 17b scarcely comes loose.

Next, another example of specific application of the flexible pipe 1 will be described.

Figure 11:
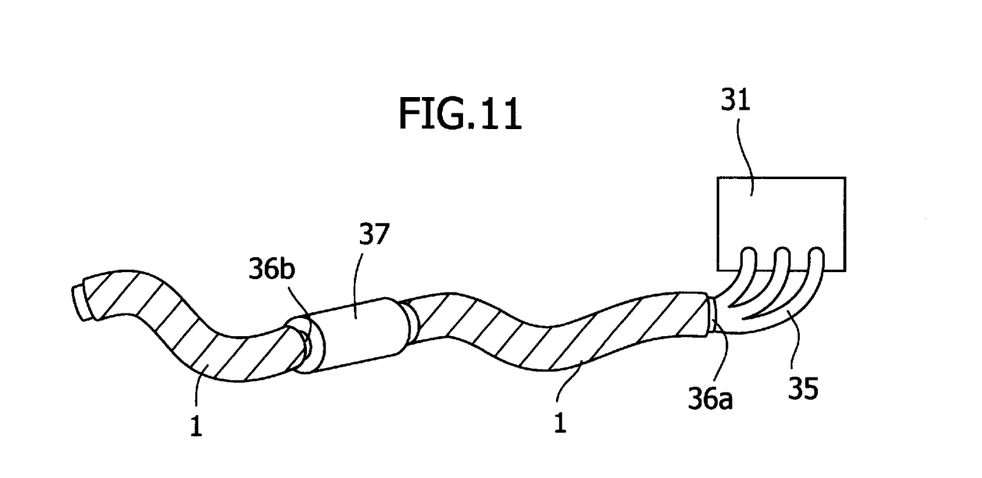
FIG. 11 is a schematic view of an engine and an exhaust pipe, showing another example of specific application of a flexible pipe in accordance with an embodiment of the present invention.

As shown in FIG. 11, on the exhaust system side of the automobile engine 31, the exhaust manifold 35 is connected, and the exhaust manifold 35 is connected with exhaust pipes 36a and 36b so as to hold the catalytic converter 37 for purifying exhaust gas between the exhaust pipes 36a and 36b. Around each of the exhaust pipes 36a and 36b, the flexible pipe 1 is mounted.

This flexible pipe 1 is mounted on the exhaust pipes 36a and 36b as a heat insulating cover against exhaust gas. The flexible pipe 1 contributes to an increase in capacity of treatment of a harmful substance (gas), such as graphite, etc. in the reaction of a catalyst disposed in the catalytic converter 37. In addition, it achieves the same effect as that in the above-mentioned specific application as the heat insulating material for the exhaust pipe 36a. Also, looseness of the collapsed portion due to vibrations etc. does not occur.

The above is a description of the embodiments of the present invention. Needless to say, the present invention is not limited to these embodiments, and various changes and modifications can be made based on the technical concept of the present invention.

For example, the application of the flexible pipe 1 is not limited to the EGR pipe 38 or the like, and the flexible pipe 1 can be used in a portion that is not subjected to vibrations or a portion that is not hot. For example, the flexible pipe 1 can be used as a protective material for preventing interference with a vehicle-side structural member by running in a harness for electrical equipment as a vehicular tube, and also can be used in applications other than vehicles.

The diameter of the flexible pipe 1, the thickness of the band member, the length of the tubular member, the height of peak portion of the corrugations, etc. can be adapted to the application of the flexible pipe 1, and are not subject to any special restriction.

As described above, in the tubular member construction in accordance with the present invention in which a tubular member is formed by winding a metallic band material in a spiral shape in an overlapped manner, and a plurality of wavy corrugations are formed in the peripheral wall portion of the tubular member in the axial direction of the tubular member, the corrugations located in an opening end portion of the tubular member are pressed and collapsed to form a collapsed portion, or slit edge portions are formed by one split formed in the range from one opening end portion to the other opening end portion of the tubular member and the corrugations located in the split edge portions are pressed and collapsed to form a collapsed portion. Therefore, the end portion or the split edge portion of tubular member can be prevented from coming loose.

Also, if by using two or more of the metallic band materials, the band materials are overlapped with each other inside and outside to form a tubular member of two or more layers, although the end portion thereof is liable to come loose as compared with the case where the tubular member is formed by using one band material, the end portion can be prevented from coming loose by crimping the end portion.

Further, in the case where the two or more band members are formed of two or more different types of metals, if the tubular member is disposed in a hot portion, although the end portion thereof is liable to come loose due to a difference in thermal expansion between the metals as compared with the case where the tubular member is formed of the same metals, the end portion does not come loose due to the collapsed portion even in this state.

Regarding the method for forming the collapsed portions, the corrugations of the tubular member are inserted between a gear and a dolly block, which are disposed with a predetermined gap provided therebetween, and teeth of the gear are pressed against the corrugations while the gear is rotated to form the collapsed portions. Therefore, the cost is low and the work is easy.

Regarding the mounting location of tubular member, the tubular member is mounted at the outer periphery of an exhaust gas recirculation pipe for connecting an intake pipe connected to a combustion air intake port of an automobile engine to an exhaust pipe connected to a combustion gas exhaust port of the engine; Therefore, even if the worker touches the EGR pipe indirectly, the worker is prevented from getting burned.

Since this tubular member is flexible, it can be installed easily in a curved portion or a bent portion.

What is claimed is:

1. A tubular member construction in which a tubular member is formed by winding a metallic band material in a spiral shape in an overlapped manner, and a plurality of wavy corrugations are formed in the peripheral wall portion of said tubular member in the axial direction of said tubular member, wherein said corrugations located in an opening end portion of said tubular member are collapsed to form a collapsed portion so as to prevent the band material located in said opening end portion from coming loose, the collapsed portion having a greater length along the axial direction than perpendicular to the axial direction.

2. A tubular member construction in which a tubular member is formed by winding a metallic band material in a spiral shape in an overlapped manner, and a plurality of wavy corrugations are formed in the peripheral wall portion of said tubular member in the axial direction of said tubular member, wherein slit edge portions are formed by one split formed in the range from one opening end portion to the other opening end portion of said tubular member, and said corrugations located in said split edge portions are collapsed to form a collapsed portion so as to prevent the band material located in said split edge portion from coming loose.

3. The tubular member construction according to claim 1 or 2, wherein said tubular member is flexible.

4. A tubular member construction in which a tubular member is formed by winding a metallic band material in a spiral shape in an overlapped manner, and a plurality of wavy corrugations are formed in the peripheral wall portion of said tubular member in the axial direction of said tubular member, wherein said corrugations located in an opening end portion of said tubular member are collapsed to form a collapsed portion so as to prevent the band material located in said opening end portion from coming loose, wherein by using two or more of said metallic band materials, said band materials are overlapped with each other inside and outside to form a tubular member of two or more layers.

5. The tubular member construction according to claim 4, wherein said two or more band members are formed of two or more different types of metals.

6. The tubular member construction according to claim 5, wherein two of said band materials are used, and an inside layer material of said tubular member is formed of stainless steel or a stainless steel alloy and an outside layer material thereof is formed of aluminum or an aluminum alloy.

7. A tubular member construction in which a tubular member is formed by winding a metallic band material in a spiral shape in an overlapped manner, and a plurality of wavy corrugations are formed in the peripheral wall portion of said tubular member in the axial direction of said tubular member, wherein said corrugations located in an opening end portion of said tubular member are collapsed to form a collapsed portion so as to prevent the band material located in said opening end portion from coming loose, wherein the collapsed portion of said tubular member is formed in a plurality of locations at intervals.

8. The tubular member construction according to claim 7, wherein the corrugations of said tubular member is inserted between a gear and a dolly block, which are disposed with a predetermined gap provided therebetween, and teeth of said gear are pressed against said corrugations while said gear is rotated to form said collapsed portions.

9. The tubular member construction according to claim 1, wherein said tubular member is mounted at the outer periphery of an exhaust gas recirculation pipe for connecting an intake pipe connected to a combustion gas exhaust port of the engine.

10. The tubular member construction according to claim 1, wherein said tubular member is mounted around at least one of exhaust pipes connected to both ends of a catalytic converter provided on the combustion gas exhaust port side of an engine.

* * * * *